United States Patent [19]

Häussermann

[11] Patent Number: 4,886,251

[45] Date of Patent: Dec. 12, 1989

[54] HYDRAULICALLY DAMPING RUBBER BEARING ENGINE MOUNT

[75] Inventor: Gerd Häussermann, Stuttgart, Fed. Rep. of Germany

[73] Assignee: Daimler-Benz Aktiengesellschaft, Stuttgart, Fed. Rep. of Germany

[21] Appl. No.: 306,938

[22] Filed: Feb. 7, 1989

[30] Foreign Application Priority Data

Feb. 24, 1988 [DE] Fed. Rep. of Germany ....... 3805763

[51] Int. Cl.$^4$ .................. F16F 9/08; F16F 13/00; B60K 5/12
[52] U.S. Cl. .................. 267/140.1; 267/219; 267/64.28; 267/122; 267/35
[58] Field of Search .................. 267/219, 220, 64.28, 267/140.2, 140.3, 140.1, 122, 64.11, 64.14, 64.15, 64.23, 64.24, 64.27, 35; 188/298, 299, 320; 280/708, 710, 711, 712, DIG. 1, 706, 714; 180/300, 312, 902; 123/192 R, 195 R; 248/550, 562, 561, 563, 566, 573, 574, 575, 578, 636, 638, 659, 559

[56] References Cited

U.S. PATENT DOCUMENTS

| | | | |
|---|---|---|---|
| 4,049,251 | 9/1977 | Masae | 267/64.23 |
| 4,199,128 | 4/1980 | Van Boom et al. | 267/140.1 X |
| 4,211,429 | 7/1980 | Howard | 267/35 X |
| 4,234,172 | 11/1980 | Takahashi | 267/122 X |
| 4,352,487 | 10/1982 | Shtarkman | 267/219 X |
| 4,415,148 | 11/1983 | Mair et al. | 267/122 |
| 4,493,481 | 1/1985 | Merkle | 267/64.24 X |
| 4,505,462 | 3/1985 | Dan et al. | 267/140.2 |
| 4,516,545 | 5/1985 | Kumagai et al. | 188/378 X |
| 4,650,169 | 3/1987 | Eberhard et al. | 267/140.1 |
| 4,666,016 | 5/1987 | Abe et al. | 267/140.1 X |
| 4,700,933 | 10/1987 | Chikamori et al. | 267/140.1 |
| 4,712,777 | 12/1987 | Miller | 188/299 X |
| 4,720,084 | 1/1988 | Hollerweger et al. | 267/140.1 X |
| 4,756,513 | 7/1988 | Carlson et al. | 248/636 X |
| 4,757,982 | 7/1988 | Andrä et al. | 267/140.1 X |
| 4,793,600 | 12/1988 | Kojima | 267/140.1 |
| 4,802,648 | 2/1989 | Decker et al. | 248/638 X |

FOREIGN PATENT DOCUMENTS

| | | |
|---|---|---|
| 3145446 | 10/1982 | Fed. Rep. of Germany . |
| 3404593 | 8/1984 | Fed. Rep. of Germany . |
| 3441592 | 5/1986 | Fed. Rep. of Germany . |
| 0135626 | 6/1988 | Japan .................. 267/219 |

Primary Examiner—Douglas C. Butler

[57] ABSTRACT

The invention relates to a hydraulically damping rubber bearing engine mount for motor vehicles, having two end walls lying opposite one another in the axial direction and two chambers which are designed as a pressure and an auxiliary chamber and which contain a damping fluid and are connected to one another by a restricted orifice. An annular, rubber-elastic spring element adjoins the pressure chamber and is secured on an end wall. A compensating chamber adjoins the auxiliary chamber and is separated from the latter by a bellows. The damping characteristics of the rubber bearing are alterable by intervention from outside. In order to be able to alter the damping effect of the rubber bearing continuously right up to complete cancellation, a diaphragm is clamped fluid-tightly in the pressure chamber and is loaded on the one side by the damping fluid and on the other side by compressed air which can be fed in from outside. When the diaphragm is loaded by compressed air, an air chamber is formed between the diaphragm and the spring element with the diaphragm lifting off partially or completely from the spring element in response to the amount of compressed air fed from the outside in accordance with a control signal proportional to the desired vibrational characteristics of the vehicle.

4 Claims, 1 Drawing Sheet

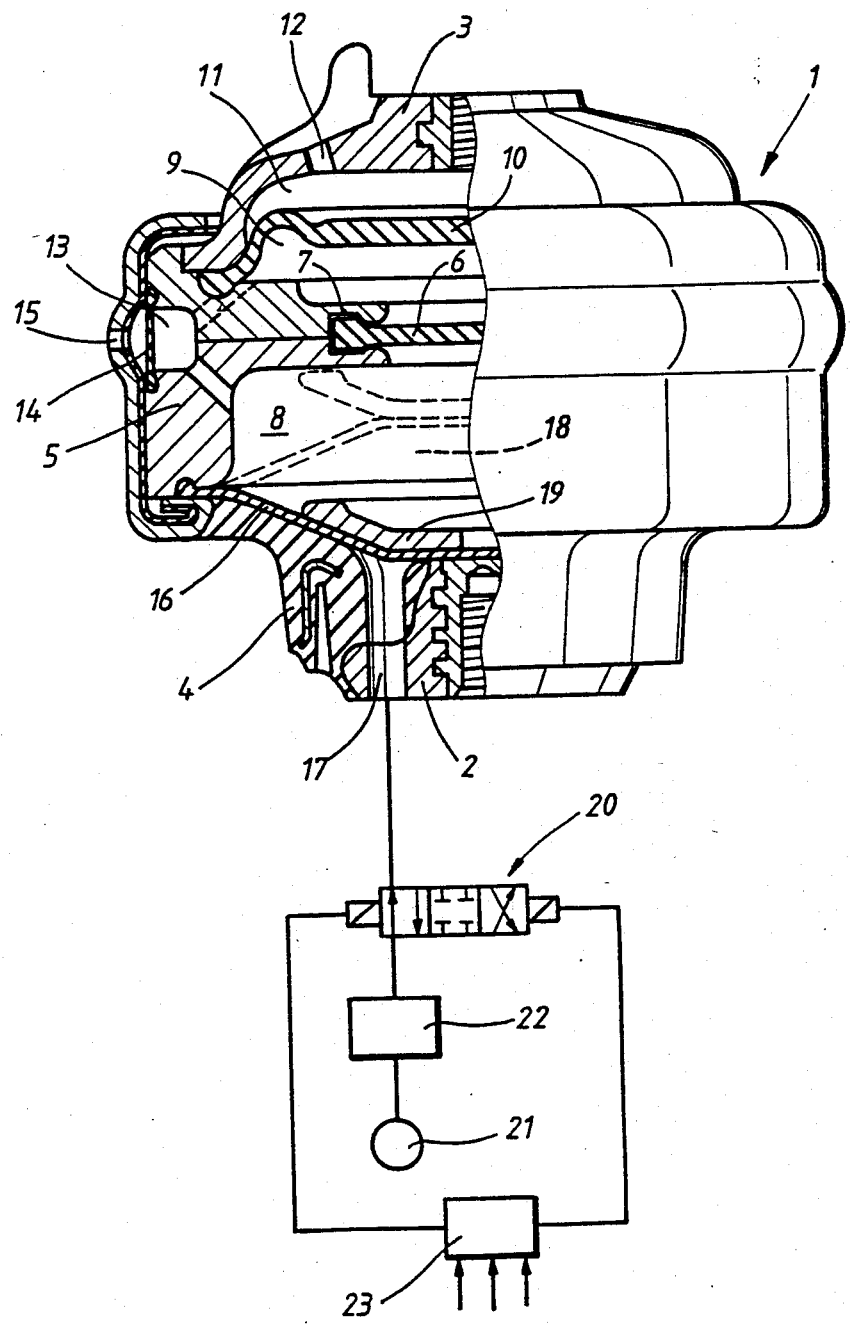

HYDRAULICALLY DAMPING RUBBER BEARING ENGINE MOUNT

BACKGROUND AND SUMMARY OF THE INVENTION

The invention relates to a hydraulically damping rubber bearing engine mount for motor vehicles having two end walls lying opposite one another in the axial direction and two chambers which are designed as pressure and auxiliary chambers and which contain a damping fluid. The two chambers are connected to one another by a restriction orifice and there is an annular rubber-elastic spring element which adjoins the pressure chamber and is secured on one end wall. A diaphragm is fluid-tightly clamped in the pressure chamber and is loaded on one side by the damping fluid and can be loaded on the other side by compressed air which can be fed in from outside. When the diaphragm is loaded by compressed air, an air chamber is formed between the diaphragm and both the spring element and the one end wall, and with the diaphragm being able to lift off from the spring element and the one end wall in response to the compressed air.

A rubber bearing of this general kind is known from DE-OS No. 3,404,593. In the case of this rubber bearing, the cross-section of the restriction orifice between the pressure chamber and the auxiliary chamber is altered stepwise as a function of an external parameter, such as a transmission adjustment. Complete cancellation of the damping effect is not possible in this rubber bearing.

An object on which this invention is based is to develop a rubber bearing of this general type in such a way that the damping effect of the bearing can be altered smoothly and continuously by external intervention right up to complete cancellation, i.e., to the decoupling of the bearing.

The object is achieved according to the invention by having the diaphragm lift off from the spring element and the one end wall either partially, or totally, to provide contact areas of varying sizes over varying regions depending on the amount of air fed and applied to load the diaphragm. When the diaphragm is completely lifted off the spring element and the one end wall, the mount is decoupled.

In the case of the rubber bearing designed according to the invention, an air chamber is built up with the introduction of compressed air into the pressure chamber between the diaphragm and both the rubber-elastic spring element and the end wall adjoining the latter. The diaphragm lifts smoothly and progressively further off from the end wall and the spring element as the air chamber grows bigger. Since the compressible air in the air chamber can transmit virtually no damping force between the damping fluid on the one hand and the one end wall and spring element on the other hand, damping forces are only transmitted to the spring element in the region of the latter where the diaphragm rests on the spring element. Thus, with the diaphragm lifted off completely from the spring element, damping forces are no longer transmitted and the rubber bearing is decoupled. Thus, in the rubber bearing designed according to the invention, the most favorable damping force can be set exactly, right up to and including the cancellation of damping, simply by feeding in compressed air and this setting can be continuously, smoothly and progressively varied.

The quantity of air in the air chamber is made dependent on the vibrational state of the engine, and/or of the region of the vehicle near to the engine, and/or the nature of the surface to be driven on by the motor vehicle to provide adjustment of the damping forces in a simple manner.

A stop body, which is secured on the diaphragm on the side loaded by fluid, limits the maximum possible extension of the diaphragm and serves for the stabilization and controlled movement of the diaphragm.

Other objects, advantages and novel features of the present invention will become apparent from the following detailed description of the invention when considered in conjunction with the accompanying drawing.

BRIEF DESCRIPTION OF THE DRAWING

The drawing FIGURE shows a damping rubber bearing according to the invention with an adjustable air chamber to control the amount of damping force transmitted.

DETAILED DESCRIPTION OF THE DRAWING

Referencing the drawing, a rubber bearing 1 has end walls 2, 3 at both its axial ends, each of which is connected to two components which vibrate with respect to one another, such as an engine and a motor vehicle which can be driven by the engine. An essentially annular rubber-elastic spring element 4 is connected fluid-tightly to the end wall 2, in a manner which permits force transmission. At the bottom (lower portion of the drawing), said spring element 4 is connected, in its radially outer region, to an annular wall 5, and the latter in turn is connected to the upper end wall 3 (at the top in the drawing). The space enclosed by the two end walls 2, 3, the spring element 4 and the annular wall 5 is subdivided by a dividing disc 6 which is mounted with play in a circumferential groove 7 on the inside of the annular wall 5. The enclosed space thus comprises a pressure chamber 8 below the dividing disc 6 and an auxiliary chamber 9 above the dividing disc 6.

The auxiliary chamber 9 is in turn divided by a bellows 10 clamped between the upper end wall 3 and the annular wall 5 to form a compensating space 11 which adjoins the upper end wall 3 and is connected to the surrounding atmospheric air via an opening 12 in the latter. The pressure chamber 8 and the auxiliary chamber 9 are filled with damping fluid, communicating via the play between the dividing disc 6 and the groove 7 and via a channel 13 in the annular wall 5. The radially outer wall of the channel 13 is formed by a diaphragm 14 which can be loaded on its rear side via the opening 15 by a fluid. This enables the cross-section of the channel 13 to be altered over essentially its entire length. Hence, the size of the channel wall and the quantity of fluid in the channel can also be altered, with the result that it is possible to match the frequency and damping force to the needed and required damping characteristics of a vehicle. A similar result can be achieved by altering the channel length. However, decoupling of the bearing is not possible by this operation.

In order to provide for recoupling, a diaphragm 16 is arranged in the pressure chamber 8 and is clamped by its edge between the spring element 4 and the annular wall 5. When resting on the end wall 2 and the spring element 4, said diaphragm transmits completely the damping forces between the spring element 4 and the damping fluid in the pressure chamber 8. If compressed air is applied to the rear side of the diaphragm 16 via a line 17 in the end wall 2 and the spring element 4, an air chamber 18 is formed between the said diaphragm and both the end wall 2 and the spring element 4. This air chamber lifts off the diaphragm 16 from the end wall 2 and spring element 4. The diaphragm lifts off over a larger or smaller region depending on the quantity of compressed air fed in as a result of the size of the air chamber 18. Since the air in the air chamber 18 is compressible, damping forces can be transmitted only to those regions in which the diaphragm 16 rests on the end wall 2 and the spring element 4. When the diaphragm is lifted off completely, as illustrated by the dashed lines in the drawing, transmission of damping forces is excluded and the bearing is decoupled. A transmission of supporting forces then takes place virtually free from damping and only via the spring element 4.

A dish-shaped stop body 19 is secured on that side of the diaphragm 16 which faces away from the end wall 2 for stabilization and controlled movement of the diaphragm 16 as well as for limiting the deflection of the diaphragm 16 by coming up against a projection of the annular wall 5.

The feeding of the compressed air to the air chamber 18 can be controlled via a multiway valve 20 which is supplied with compressed air by a pump 21 via a reservoir 22. The multiway valve 20 is electrically adjusted as a function of signals processed in a control unit 23. The signals represent the vibration behavior of the engine, or of the chassis, or particular operating conditions of the engine, such as a starting or switching-off procedure, or the nature of the surface to be driven on by the vehicle as a measure of the subsequent vibration behavior of the chassis, all in order to adjust the damping characteristics of the bearing to particular vibrations before these vibrations even occur.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A hydraulically damping rubber bearing engine mount for motor vehicles, having two end walls lying opposite one another in the axial direction with a pressure and an auxiliary chamber therebetween;

these chambers contain a damping fluid and are connected to one another by a restricted orifice;

an annular rubber-elastic spring element means coupled to the engine mount for transmitting a variable force to the engine mount and wherein said spring element means adjoins the pressure chamber and is secured on one of said walls;

a diaphragm is fluid-tightly clamped in the pressure chamber and is loaded on one side by the damping fluid and can be loaded on the other side by compressed air fed in from outside of the engine mount;

means for loading the diaphragm with a quantity of compressed air so as to form an air chamber between the diaphragm and both the spring element and said one end wall with the diaphragm lifting off from therefrom;

and wherein the means for loading the diaphragm causes the diaphragm to lift off from the spring element means and the one end wall either partially, or totally, to provide contact areas with the spring element and the one end wall of varying sizes over varying regions depending on the size of the air chamber, and;

wherein the spring element means is fully coupled to the engine mount to transmit full force from the spring element means when the diaphragm is not lifted from the spring element means, is partially coupled to transmit a reduced force when the diaphragm is partially lifted from the spring element means and is fully decoupled to transmit no force from the spring element means when the diaphragm is fully lifted from the spring element means.

2. A rubber bearing according to claim 1, wherein the quantity of air in the air chamber is dependent on at least one of the vibrational state of the engine, the region of the vehicle near to the engine, and the nature of a surface to be driven on by the motor vehicle.

3. A rubber bearing according to claim 1, wherein a dish-shaped stop body is secured on the diaphragm on the side loaded by the damping fluid.

4. A rubber bearing according to claim 2, wherein a dish-shaped stop body is secured on the diaphragm on the side loaded by the damping fluid.

* * * * *